(12) United States Patent
Seo et al.

(10) Patent No.: US 7,169,075 B2
(45) Date of Patent: Jan. 30, 2007

(54) SIX-SPEED POWERTRAIN OF AN AUTOMATIC TRANSMISSION

(75) Inventors: Gang Soo Seo, Suwon (KR); Ki Been Lim, Suwon (KR); Hyu Tae Shim, Hwaseong (KR); Gyung Cheol Lee, Gunpo (KR); Byeong Ho Soh, Hwaseong (KR)

(73) Assignee: Hyundai Motor Company, Seoul (KR)

( * ) Notice: Subject to any disclaimer, the term of this patent is extended or adjusted under 35 U.S.C. 154(b) by 148 days.

(21) Appl. No.: 11/028,289

(22) Filed: Dec. 30, 2004

(65) Prior Publication Data

US 2006/0035744 A1    Feb. 16, 2006

(30) Foreign Application Priority Data

Aug. 11, 2004    (KR) .................. 10-2004-0063254

(51) Int. Cl.
*F16H 3/62* (2006.01)

(52) U.S. Cl. ..................... 475/278; 475/275

(58) Field of Classification Search ................ 475/275, 475/278
See application file for complete search history.

(56) References Cited

U.S. PATENT DOCUMENTS

| | | | | |
|---|---|---|---|---|
| 3,339,431 | A * | 9/1967 | Croswhite et al. | 475/56 |
| 6,361,468 | B1 * | 3/2002 | Kato et al. | 475/344 |
| 6,558,287 | B2 * | 5/2003 | Hayabuchi et al. | 475/271 |
| 6,811,513 | B1 * | 11/2004 | Filanovsky et al. | 475/284 |
| 6,997,843 | B2 * | 2/2006 | Saitou | 475/269 |
| 7,044,881 | B2 * | 5/2006 | Tabata et al. | 475/284 |
| 7,052,430 | B2 * | 5/2006 | Stevenson et al. | 475/278 |

* cited by examiner

*Primary Examiner*—Ha Ho
(74) *Attorney, Agent, or Firm*—Morgan Lewis & Bockius LLP

(57) ABSTRACT

A six-speed powertrain includes a simple planetary gearset having three operational elements and a compound planetary gearset having four operational elements. Regarding the four operational elements of the compound planetary gearset, two of them are variably connected to an input shaft where one of the two is variable connected to a transmission case, another one always acts as an output element, and the other one variably receives torque from the simple planetary gearset at a reduce speed.

42 Claims, 11 Drawing Sheets

| Operational element | CLUTCH | | | BRAKE | | OWC | Shift ratio (exemplary value) |
|---|---|---|---|---|---|---|---|
| | C1 | C2 | C3 | B1 | B2 | | |
| D 1st | ● | | | | ○ | ● | 4.044 |
| D 2nd | ● | | | ● | | | 2.371 |
| D 3rd | ● | | ● | | | | 1.556 |
| D 4th | ● | ● | | | | | 1.159 |
| D 5th | | ● | ● | | | | 0.852 |
| D 6th | | ● | | ● | | | 0.672 |
| R | | | ● | | ● | | 3.193 |

FIG. 14 –PRIOR ART–
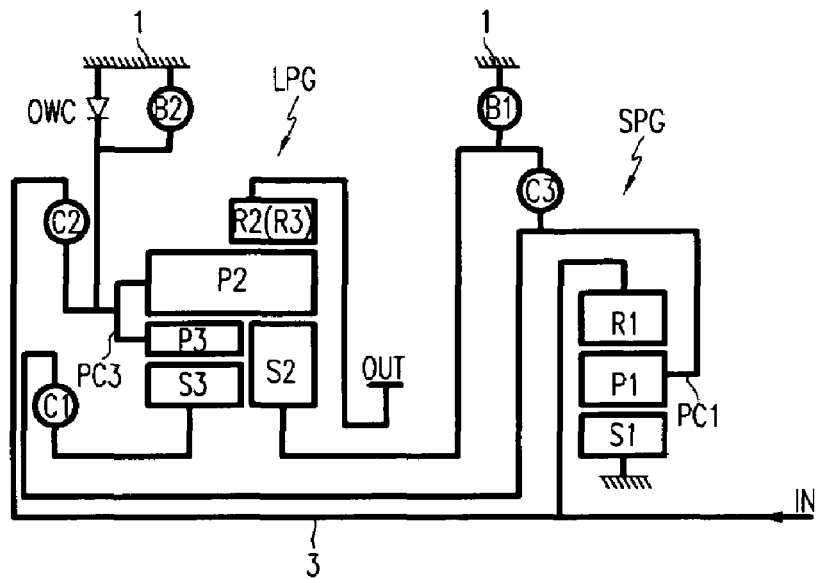
FIG. 15 –PRIOR ART–
|     | C1 | C2 | C3 | B1 | B2  | OWC | GEAR RATIO | STEP   |
|-----|----|----|----|----|-----|-----|------------|--------|
| P   |    |    |    |    |     |     |            |        |
| REV |    |    | ○  |    | ○   |     | 3.389      |        |
| N   |    |    |    |    |     |     |            |        |
| 1ST | ○  |    |    |    | (○) | ○   | 4.067      | ) 1.73 |
| 2ND | ○  |    |    | ○  |     |     | 2.354      | ) 1.51 |
| 3RD | ○  |    | ○  |    |     |     | 1.564      | ) 1.35 |
| 4TH | ○  | ○  |    |    |     |     | 1.161      | ) 1.35 |
| 5TH |    | ○  | ○  |    |     |     | 0.857      | ) 1.25 |
| 6TH |    | ○  |    | ○  |     |     | 0.684      |        |

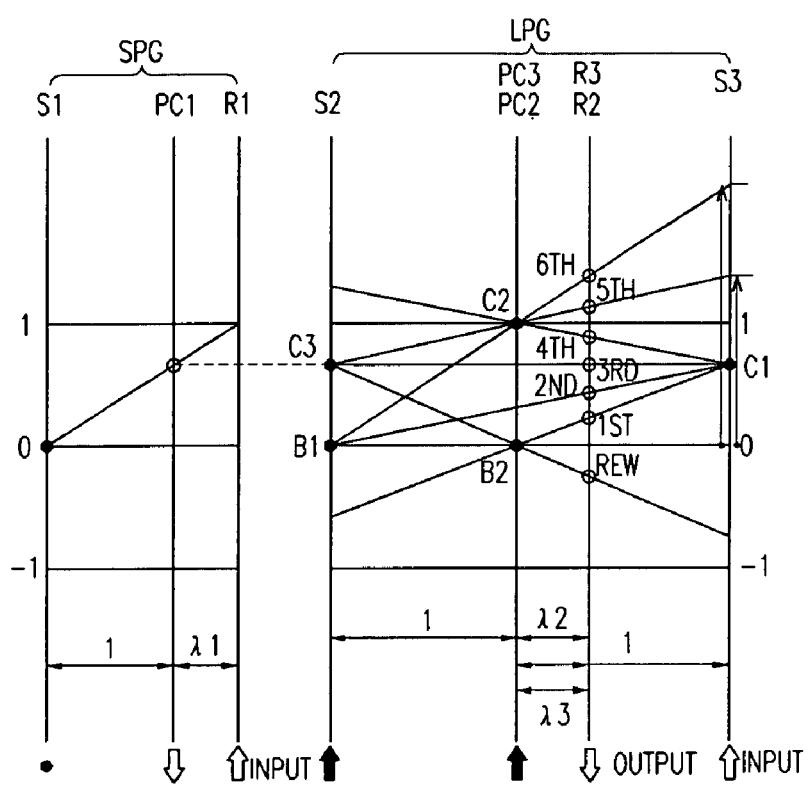
FIG. 16 –PRIOR ART–

SIX-SPEED POWERTRAIN OF AN AUTOMATIC TRANSMISSION

CROSS-REFERENCE TO RELATED APPLICATION

This application claims priority to and the benefit of Korean Patent Application No. 10-2004-0063254 filed in the Korean Intellectual Property Office on Aug. 11, 2004, the entire content of which is incorporated herein by reference.

FIELD OF THE INVENTION

Generally, the present invention relates to an automatic transmission. More particularly, the present invention relates to a powertrain of an automatic transmission.

BACKGROUND OF THE INVENTION

A multi-stage gearshift mechanism of an automatic transmission includes a plurality of planetary gearsets. A powertrain having such a plurality of planetary gearsets varies the torque in multi-stages and outputs it to an output shaft when receiving a converted engine torque from a torque converter. The more speeds the powertrain of an automatic transmission has, the better power performance and fuel consumption. Therefore, it is desirable to have as many speeds as possible in powertrains.

Even for the same number of speeds, durability, power transmission efficiency, and size/weight of a transmission are substantially dependent on how planetary gearsets are arranged. Therefore, research for more structural strength, less power loss, and more compact packaging are under continuing investigation.

Usually, development of a powertrain using planetary gearsets does not devise a wholly new type of planetary gearsets. To the contrary, it invokes how single/double pinion planetary gearsets are combined, and how clutches, brakes, and one-way clutches are disposed to the combination of planetary gearsets such that required shift speeds and speed ratios are realized with minimal power loss.

As for a manual transmission, too many speeds cause a driver the inconvenience of excessive manual shifting. However, for an automatic transmission, a transmission control unit automatically executes shifting by controlling the operation of the power train, and therefore, more speeds usually implies more merits.

Accordingly, research of four-speed and five-speed powertrains has been undertaken, and recently, a powertrain of an automatic transmission enabling six forward speeds and one reverse speed has been developed.

An example of a conventional powertrain is shown in FIG. 14. The exemplary powertrain includes a combination of one simple planetary gearset SPG in the front and one Ravingneaux planetary gearset LPG of a Ravingneaux type in the rear. A first sun gear S1 of the simple planetary gearset SPG is fixed to a transmission case 1, and a second ring gear R2 (or equivalently, a third ring gear R3) of the Ravingneaux planetary gearset LPG is connected to an output gear OUT such that it acts as an output element In addition, a first ring gear R1 of the simple planetary gearset SPG is fixedly connected to an input shaft 3, and a third planet carrier PC3 interconnecting second and third planetary gears P2 and P3 of the Ravingneaux planetary gearset LPG is variably connected to the input shaft 3 interposing a second clutch C2.

In addition, a first planet carrier PC1 carrying first planetary gear P1 of the simple planetary gearset SPG is variably connected to a third sun gear S3 of the Ravingneaux planetary gearset LPG interposing a first clutch C1. In addition, the first planet carrier PC1 is variably connected to a second sun gear S2 interposing a third clutch C3.

The second sun gear S2 is connected to the transmission case 1 interposing a first brake B1. A third planet carrier PC3 carrying second and third planetary gears P2 and P3 of the Ravingneaux planetary gearset LPG is connected to the transmission case 1 interposing a second brake B2 and a one-way clutch OWC in parallel.

Such a powertrain is operated as shown in FIG. 15 to realize six forward speeds and one reverse speed. That is, the first clutch C1 and the one-way clutch OWC (or equivalently the second brake B2) operate in a first forward speed, the first clutch C1 and the first brake B1 operate in a second forward speed, the first clutch C1 and the third clutch C3 operate in a third speed, the first clutch C1 and the second clutch C2 operate in a fourth speed, the second and third clutches C2 and C3 operate in a fifth speed, the second clutch C2 and the first brake B1 operate in a sixth speed, and the third clutch C3 and the second brake B2 operate in a reverse speed.

According to such a powertrain, as shown in FIG. 16, three planetary gearsets are under a load for power transmission at one speed, i.e., at a second forward speed. At three speeds, i.e., at first, fourth, and fifth speeds, two planetary gearsets are under a load for power transmission. At two speeds, i.e., at third and sixth speeds, one planetary gearset is under a load for power transmission.

Therefore, at any speed, at least one planetary gearset becomes under a load of power transmission, and accordingly, power transmission efficiency becomes deteriorated.

According to such a powertrain, the third sun gear S3 of the Ravingneaux planetary gearset LPG is connected to one operational element of the simple planetary gearset SPG, and accordingly, it is under a high load amounting about 1.5 times of input torque. Therefore, durability of a powertrain is deteriorated.

The information disclosed in this Background of the Invention section is only for enhancement of understanding of the background of the invention and should not be taken as an acknowledgement or any form of suggestion that this information forms the prior art that is already known in this country to a person of ordinary skill in the art.

SUMMARY OF THE INVENTION

The present invention has been made in an effort to provide a six-speed powertrain of an automatic transmission having advantages of enhanced durability and power transmission efficiency.

An exemplary six-speed powertrain of an automatic transmission according to an embodiment of the present invention includes a simple planetary gearset and a compound planetary gearset.

The simple planetary gearset includes a first sun gear, a first planet carrier, and a first ring gear so as to form a first operation element fixedly connected to a transmission case, a second operational element variably connected to the transmission case, and a third operational element variably or fixedly connected to an input shaft.

The compound planetary gearset includes second and third sun gears, a shared ring gear, and a shared planet carrier so as to form a fourth operational element variably or fixedly connected to the second operational element, a fifth operational element variably connected to the input shaft, a sixth operational element always acting as an output element, and a seventh operational element variably connected to the input shaft.

In a further embodiment, the first operational element is the first sun gear of the simple planetary gearset; the second operational element is the first planet carrier of the simple planetary gearset; the third operational element is the first ring gear of the simple planetary gearset; the fourth operational element is the second sun gear of the compound planetary gearset; the fifth operational element is the shared planet carrier of the compound planetary gearset; the sixth operational element is the shared ring gear of the compound planetary gearset; and the seventh operational element is the third sun gear of the compound planetary gearset, wherein: the fourth operational element is fixedly connected to the second operational element and variably connected to the transmission case via a first brake; the fifth operational element is variably connected to the transmission via at least one of a second brake and a one-way clutch; the seventh operational element is variably connected to the input shaft via a first clutch; the fifth operational element is variably connected to the input shaft via a second clutch; and the third operational element is variably connected to the input shaft via a third clutch.

The simple planetary gearset may be realized as a single pinion planetary gearset.

The compound planetary gearset may be realized as a Ravingneaux planetary gearset.

A torque of the input shaft may be transmitted from the simple planetary gearset to the compound planetary gearset at a reduced speed through an input route from the second operational element to the fourth operational element.

In this case, the transmission of the torque of the input shaft from the simple planetary gearset to the compound planetary gearset may be enabled at third, fifth, and reverse speeds by an operation of the third clutch that variably connects the input shaft and the third operational element.

Such a powertrain may achieve six forward speeds and one reverse speed in the following operation: the first clutch and at least one of the second brake and the one-way clutch operate at a first forward speed; the first clutch and the first brake operate at a second forward speed; the first clutch and the third clutch operate at a third forward speed; the first clutch and the second clutch operate at a fourth forward speed; the second clutch and the third clutch operate at a fifth forward speed; the second clutch and the first brake operate at a sixth forward speed; and the third clutch and the second brake operate at a the reverse speed.

The first and second clutches may be positioned opposite of the input shaft with respect to the compound planetary gearset.

The first and second clutches may be positioned between the compound planetary gearset and the simple planetary gearset.

The third clutch may be positioned between the compound planetary gearset and the simple planetary gearset.

The at least one of the second brake and the one-way clutch may be positioned opposite of the input shaft with respect to the compound planetary gearset.

The at least one of the second brake and the one-way clutch may be positioned between the compound planetary gearset and the simple planetary gearset.

In another further embodiment: the first operational element is the first sun gear of the simple planetary gearset; the second operational element is the first planet carrier of the simple planetary gearset; the third operational element is the first ring gear of the simple planetary gearset; the fourth operational element is the second sun gear of the compound planetary gearset; the fifth operational element is the shared planet carrier of the compound planetary gearset; the sixth operational element is the shared ring gear of the compound planetary gearset; and the seventh operational element is the third sun gear of the compound planetary gearset, wherein: the third operational element is fixedly connected to the input shaft; the fourth operational element is variably connected to the transmission case via a first brake; the fifth operational element is variably connected to the transmission via at least one of a second brake and a one-way clutch; the seventh operational element is variably connected to the input shaft via a first clutch; the fifth operational element is variably connected to the input shaft via a second clutch; and the fourth operational element is variably connected to the second operational element via a third clutch.

The simple planetary gearset may be realized as a single or a double pinion planetary gearset.

The compound planetary gearset may be realized as a Ravingneaux planetary gearset.

A torque of the input shaft may be transmitted from the simple planetary gearset to the compound planetary gearset at a reduced speed through an input route from the second operational element to the fourth operational element.

In this case, the transmission of the torque of the input shaft from the simple planetary gearset to the compound planetary gearset may be enabled at third, fifth, and reverse speeds by an operation of the third clutch that variably connects the second and fourth operational elements.

Such a powertrain may achieve six forward speeds and one reverse speed in the following operation: the first clutch and at least one of the second brake and the one-way clutch operate at a first forward speed; the first clutch and the first brake operate at a second forward speed; the first clutch and the third clutch operate at a third forward speed; the first clutch and the second clutch operate at a fourth forward speed; the second clutch and the third clutch operate at a fifth forward speed; the second clutch and the first brake operate at a sixth forward speed; and the third clutch and the second brake operate at a the reverse speed.

The first and second clutches may be positioned opposite of the input shaft with respect to the compound planetary gearset.

The first and second clutches may be positioned between the compound planetary gearset and the simple planetary gearset.

The third clutch may be positioned opposite of the input shaft with respect to the simple planetary gearset.

The at least one of the second brake and the one-way clutch may be positioned opposite of the input shaft with respect to the compound planetary gearset.

In a still further embodiment, the first clutch is positioned between the compound planetary gearset and the simple planetary gearset; the second clutch is positioned opposite of the input shaft with respect to the compound planetary gearset; and the third clutch is positioned opposite of the input shaft with respect to the simple planetary gearset.

Another exemplary six-speed powertrain of an automatic transmission according to an embodiment of the present invention includes a simple planetary gearset and a Ravingneaux planetary gearset disposed to a rear of the simple planetary gearset. The simple planetary gearset includes first, second, and third operational elements of a first sun gear, a first planet carrier, and a first ring gear. The Ravingneaux planetary gearset includes fourth, fifth, and sixth operational elements of a second sun gear, a third sun gear, a shared planet carrier, and a shared ring gear.

The first sun gear of the simple planetary gearset is fixedly connected to a transmission case so as to always act as a fixed element. The first ring gear of the simple planetary gearset is fixedly or variably connected to an input shaft. The shared ring gear of the Ravingneaux planetary gearset always acts as an output element. The shared planet carrier of the Ravingneaux planetary gearset is variably connected to the input shaft. The third sun gear of the Ravingneaux planetary gearset is variably connected to the input shaft. The second sun gear of the Ravingneaux planetary gearset is fixedly or variably connected to the first planet carrier of the simple planetary gearset.

In a further embodiment, the second sun gear is fixedly connected to the first planet carrier; the second sun gear is variably connected to the transmission case via a first brake; the shared planet carrier is variably connected to the input shaft via at least one of a second brake and a one-way clutch; the third sun gear is variably connected to the input shaft via a first clutch; the shared planet carrier is variably connected to the input shaft via a second clutch; and the first ring gear is variably connected to the input shaft via a third clutch.

A torque of the input shaft may be transmitted from the simple planetary gearset to the Ravingneaux planetary gearset at a reduced speed through an input route from the first planet carrier to the second sun gear.

In this case, the transmission of the torque of the input shaft from the simple planetary gearset to the Ravingneaux planetary gearset may be enabled at third, fifth, and reverse speeds by an operation of the third clutch that variably connects the input shaft and the first ring gear.

Such a powertrain may achieve six forward speeds and one reverse speed in the following operation: the first clutch and at least one of the second brake and the one-way clutch operate at a first forward speed; the first clutch and the first brake operate at a second forward speed; the first clutch and the third clutch operate at a third forward speed; the first clutch and the second clutch operate at a fourth forward speed; the second clutch and the third clutch operate at a fifth forward speed; the second clutch and the first brake operate at a sixth forward speed; and the third clutch and the second brake operate at a the reverse speed.

The first and second clutches may be positioned opposite of the input shaft with respect to the Ravingneaux planetary gearset.

The first and second clutches may be positioned between the Ravingneaux planetary gearset and the simple planetary gearset.

The third clutch may be positioned between the Ravingneaux planetary gearset and the simple planetary gearset.

The at least one of the second brake and the one-way clutch may be positioned opposite of the input shaft with respect to the Ravingneaux planetary gearset.

The at least one of the second brake and the one-way clutch may be positioned between the Ravingneaux planetary gearset and the simple planetary gearset.

In another further embodiment, the first ring gear is fixedly connected to the input shaft; the second sun gear is variably connected to the transmission case via a first brake; the shared planet carrier is variably connected to the input shaft via at least one of a second brake and a one-way clutch; the third sun gear is variably connected to the input shaft via a first clutch; the shared planet carrier is variably connected to the input shaft via a second clutch; and the second sun gear is variably connected to the first planet carrier via a third clutch A torque of the input shaft may be transmitted from the simple planetary gearset to the Ravingneaux planetary gearset at a reduced speed through an input route from the first planet carrier to the second sun gear.

In this case, the transmission of the torque of the input shaft from the simple planetary gearset to the Ravingneaux planetary gearset may be enabled at third, fifth, and reverse speeds by an operation of the third clutch that variably connects the second sun gear and the first planet carrier.

Such a powertrain may achieve six forward speeds and one reverse speed in the following operation: the first clutch and at least one of the second brake and the one-way clutch operate at a first forward speed; the first clutch and the first brake operate at a second forward speed; the first clutch and the third clutch operate at a third forward speed; the first clutch and the second clutch operate at a fourth forward speed; the second clutch and the third clutch operate at a fifth forward speed; the second clutch and the first brake operate at a sixth forward speed; and the third clutch and the second brake operate at a the reverse speed.

The first and second clutches may be positioned opposite of the input shaft with respect to the Ravingneaux planetary gearset.

The first and second clutches may be positioned between the Ravingneaux planetary gearset and the simple planetary gearset.

The third clutch may be positioned close to the input shaft with respect to the simple planetary gearset.

The at least one of the second brake and the one-way clutch may be positioned opposite of the input shaft with respect to the Ravingneaux planetary gearset.

In a still further embodiment, the first clutch is positioned between the Ravingneaux planetary gearset and the simple planetary gearset; the second clutch is positioned opposite of the input shaft with respect to the Ravingneaux planetary gearset; and the third clutch is positioned close to the input shaft with respect to the simple planetary gearset.

BRIEF DESCRIPTION OF THE DRAWINGS

The accompanying drawings illustrate exemplary embodiments of the present invention, and, together with the description, serve to explain the principles of the present invention, wherein:

FIG. 14 is a schematic diagram of a conventional powertrain;

FIG. 15 is an operational chart for a powertrain of FIG. 14; and

FIG. 16 is a speed diagram for first to sixth forward speeds and reverse speed of a conventional powertrain.

DETAILED DESCRIPTION OF THE EMBODIMENTS

Embodiments of the present invention will hereinafter be described in detail with reference to the accompanying drawings.

Figures 1, 2:
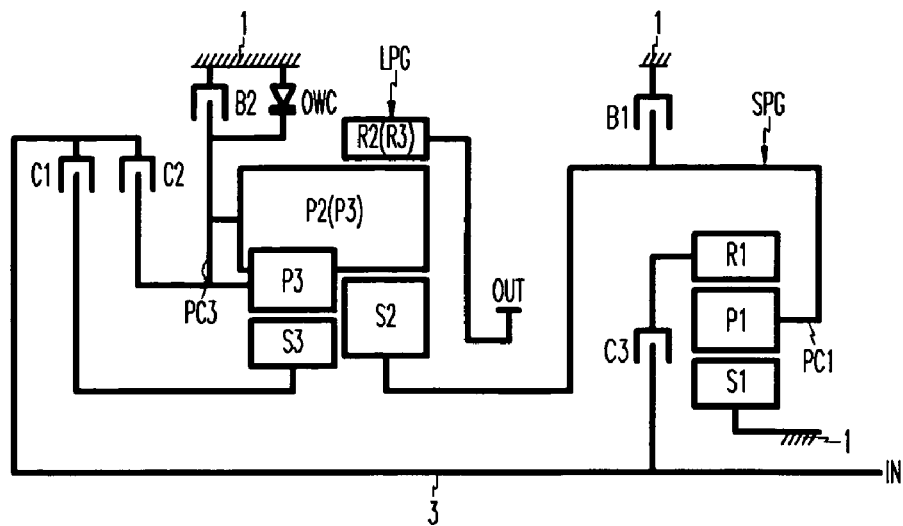
FIG. 1 is a schematic diagram of a powertrain according to a first embodiment of the present invention.
FIG. 2 is an operational chart applicable to any embodiment of the present invention.

As shown in FIG. 1, a powertrain according to a first embodiment of the present invention includes a single pinion simple planetary gearset SPG having a first sun gear S1, a first planetary gear P1, and a first ring gear R1. The simple planetary gearset SPG is disposed to a front of an input shaft 3 connected to an output side of an engine via a torque converter (not shown).

A powertrain according to a first embodiment of the present invention further includes a Ravingneaux planetary gearset LPG having second and third sun gears S2 and S3, second and third ring gears R2 and R3, a second planetary gear P2, and a pair of third planetary gears P3. The second and third ring gears R2 and R3 are monolithically formed such that the Ravingneaux planetary gearset LPG has effectively one ring gear. In this sense, the ring gear of the Ravingneaux planetary gearset LPG is hereinafter referred to as a second ring gear R2. The second planetary gear P2 is monolithically formed with one of the pair of the third planetary gears P3 and engaged with the second ring gear R2 and the second sun gear S2. The Ravingneaux planetary gearset LPG is disposed to a rear of the simple planetary gearset SPG.

The simple planetary gearset SPG includes, as its operational elements, the first sun gear S1, the first ring gear R1, and a first planet carrier PC1 rotatably supporting the first planetary gear P1 engaged with the first sun gear S1 and the first ring gear R1.

The Ravingneaux planetary gearset LPG includes, as its operational elements, the second sun gear S2, the third sun gear S3, a second ring gear R2, and a third planet carrier PC3 rotatably supporting the second and third planetary gears P2 and P3.

Regarding the arrangement of the planetary gearsets, the simple planetary gearset SPG is disposed forward in a transmission, and the Ravingneaux planetary gearset LPG is disposed rearward in the transmission.

Regarding the simple planetary gearset SPG, the first sun gear S1 is fixed to a transmission case 1 so as to always act as a fixed element. The first planet carrier PC1 outputs a reduced speed in cooperation with the first ring gear R1. The first ring gear R1 is variably connected to an input shaft 3 via a third clutch C3 such that it may rotate at a same speed with the input shaft 3 and accordingly act as an input element of the simple planetary gearset SPG. Therefore, the simple planetary gearset SPG forms three operational elements.

Regarding the Ravingneaux planetary gearset LPG, the second sun gear S2 is fixedly connected to the first planet carrier PC1 of the second operational element of the simple planetary gearset SPG such that it may receive a reduced speed therefrom. The third sun gear S3 is variably connected to the input shaft 3 via a first clutch C1 such that it may rotate at a same speed with the input shaft 3 and accordingly act as an input element of the Ravingneaux planetary gearset LPG. The third planet carrier PC3 is variably connected to the input shaft 3 via a second clutch C2, and may act as an input element. The second ring gear R2 always acts as an output element. Therefore, the Ravingneaux planetary gearset LPG forms four operational elements, effectively.

Therefore, a powertrain according to the first embodiment of the present invention forms seven operational elements in total.

The first planet carrier PC1 is variably connected to the transmission case 1 via a first brake B1, and is subject to a stopping operation of the first brake B1. The planet carrier PC3 is variably connected to the transmission case 1 via a second brake B2 and a one-way clutch OWC disposed in parallel and is subject to a stopping operation of the second brake B2 and the one-way clutch OWC.

The first sun gear S1 (i.e., an element fixed to the transmission case 1) is hereinafter called a first operational element. The first ring gear R1 (i.e., an element rotatable at a same speed with the input shaft 3) is hereinafter called a third operational element. The first planet carrier PC1 (i.e., an element outputting a reduced speed in cooperation with the third operational element) is hereinafter called a second operational element.

The second sun gear S2 (i.e., an element of the Ravingneaux planetary gearset LPG that receives a reduced speed from the second operational element) is hereinafter called a fourth operational element. The third planet carrier PC3 (i.e., an element of the Ravingneaux planetary gearset LPG that may rotate at a same speed with the input shaft 3 and may be subject to a stopping operation of a brake) is hereinafter called a fifth operational element. The second ring gear R2 (i.e., an element of the Ravingneaux planetary gearset LPG that always acts as an output element) is hereinafter called a sixth operational element. The third sun gear S3 (i.e., an element of the Ravingneaux planetary gearset LPG that may rotate at a same speed with the input shaft 3) is hereinafter called a seventh operational element.

According to the first embodiment, the first clutch C1 and second clutch C2 is positioned opposite of the input shaft 3 with respect to the Ravingneaux planetary gearset LPG. The third clutch C3 is positioned between the Ravingneaux planetary gearset LPG and the simple planetary gearset SPG. In addition, the second brake B2 and the one-way clutch OWC disposed in parallel are positioned opposite of the input shaft 3 with respect to the Ravingneaux planetary gearset LPG.

According to such an arrangement of planetary gearsets, a powertrain according to the first embodiment of the present invention forms three input routes for the Ravingneaux planetary gearset LPG to receive input torque directly or indirectly from the input shaft 3.

A first input route is formed by a variable connection between the third sun gear S3 and the input shaft 3. A second input route is formed by a variable connection between the third planet carrier PC3 and the input shaft 3. A third input route is formed by a fixed connection between the second sun gear S2 and the first planet carrier PC1.

Such a powertrain of the first embodiment forms six forward speeds and one reverse speed by operating according to an operational chart shown in FIG. 2.

That is, the first clutch C1 and the one-way clutch OWC operate at first forward speed. For a second forward speed, the first brake B1 operates from the first forward speed. For a third forward speed, the first brake B1 is released and the third clutch C3 operates from the second forward speed. For a fourth forward speed, third clutch C3 is released and the second clutch C2 operates from the third forward speed. For a fifth forward speed, first clutch C1 is released and the third clutch C3 operates from the fourth forward speed. For a sixth forward speed, third clutch C3 is released and the first brake B1 operates from the fifth forward speed. At a reverse speed, third clutch C3 and second brake B2 operate.

Shifting operation of a powertrain according to a first embodiment of the present invention is hereinafter described in detail with reference to FIG. 3.

Figure 3:
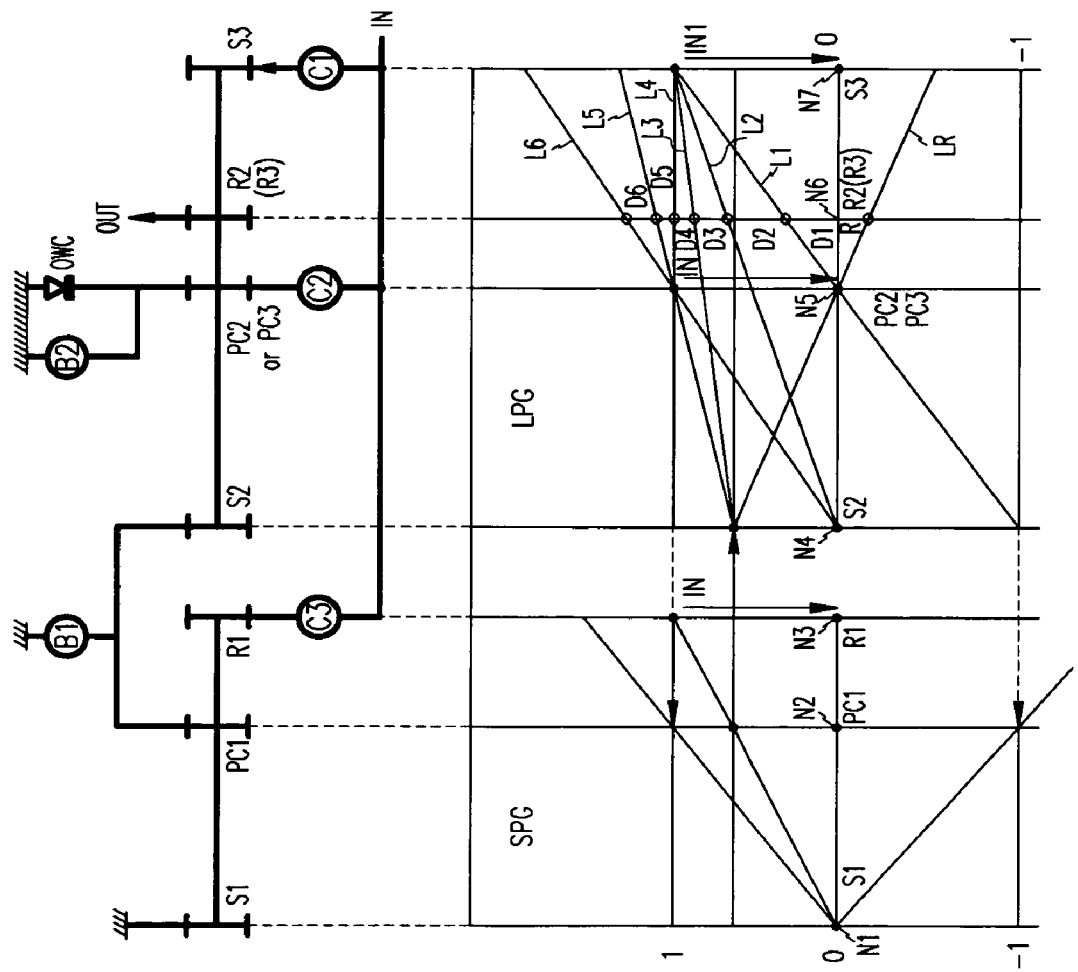
FIG. 3 is a speed diagram for a powertrain according to a first embodiment of the present invention.

As shown in lever diagram and speed diagram of FIG. 3, the seven operational elements form seven nodes N1 to N5 in a lever diagram, and the first to seventh operational elements are respectively located at first to seventh nodes N1 to N5.

In more detail, the first operational element (according to the first embodiment, the first sun gear S1) is located at the first node N1. The second operational element (according to the first embodiment, the first planet carrier PC1) is located at the second node N2. The third operational element (according to the first embodiment, the first ring gear R1) is located at the third node N3. The fourth operational element (according to the first embodiment, the second sun gear S2) is located at the fourth node N4. The fifth operational element (according to the first embodiment, the third planet carrier PC2) is located at the fifth node N5. The sixth operational element (according to the first embodiment, the second ring gear R2) is located at the sixth node N6. The seventh operational element (according to the first embodiment, the third sun gear S3) is located at the seventh node N7.

As shown in FIG. 2, the one-way clutch OWC (or, the first brake B2) and the first clutch C1 operate at the first speed.

In this case, the third sun gear S3 (refer to the seventh node N7 of FIG. 3) rotates at the same speed with the input shaft 3 while the third planet carrier PC3 (i.e., the fifth node N5) is stopped. Therefore, the Ravingneaux planetary gearset LPG forms a speed line L1 shown in FIG. 3. Accordingly, an output speed of the second ring gear R2 (i.e., the sixth node N6) rotates at a speed D1, and the first forward speed is realized.

For a second forward speed, the first brake B1 operates from the first speed.

Then, the second sun gear S2 becomes stationary while the third sun gear S3 remains rotating at the input speed. Therefore in this case, the Ravingneaux planetary gearset LPG forms a speed line L2 shown in FIG. 3. Accordingly, an output speed of the second ring gear R2 (i.e., the sixth node N6) rotates at a speed D2, and the second forward speed is realized.

For a third forward speed, the first brake B1 is released and the third clutch C3 operates from the second forward speed.

Then, the second sun gear S2 receives a reduced speed from the first planet carrier PC1. Accordingly, the second sun gear S2 rotates at a speed lower than the input speed while the third sun gear S3 remains rotating at the input speed. Therefore in this case, the Ravingneaux planetary gearset LPG forms a speed line L3 shown in FIG. 3. Accordingly, an output speed of the second ring gear R2 (i.e., the sixth node N6) rotates at a speed D3, and the third forward speed is realized.

For a fourth forward speed, the third clutch C3 is released and the second clutch C2 operates from the third forward speed.

In this case, two operational elements of the third sun gear S3 (i.e., the fourth node N4) and the third planet carrier PC3 (i.e., the fifth node N5) rotate at the same speed with the input shaft. Accordingly in this case, the Ravingneaux planetary gearset LPG integrally rotates, and therefore, the Ravingneaux planetary gearset LPG forms a speed line L4 shown in FIG. 3. Accordingly, an output speed of the second ring gear R2 (i.e., the sixth node N6) rotates at a speed D4, and the fourth forward speed is realized.

At the fourth forward speed, the Ravingneaux planetary gearset LPG integrally rotates while the simple planetary gearset SPG does not contribute to the power transmission. Therefore, at such a fourth speed, torque is transmitted through the powertrain without any loss.

For a fifth forward speed, the first clutch C1 is released and the third clutch C3 operates from the fourth forward speed.

In this case, the third planet carrier PC3 (i.e., the fifth node N5) rotates at the input speed due to the operation of the second clutch C2, while the second sun gear S2 (i.e., the fourth node N4) rotates at the reduced speed due to the operation of the third clutch C3. Therefore, the Ravingneaux planetary gearset LPG forms a speed line L5 shown in FIG. 3. Accordingly, an output speed of the second ring gear R2 (i.e., the sixth node N6) rotates at a speed D5, and the fifth forward speed is realized.

For a sixth forward speed, the third clutch C3 is released and the first brake B1 operates from the fifth forward speed.

In this case, the third planet carrier PC3 (i.e., the fifth node N5) remains rotating at the input speed, while the second sun gear S2 (i.e., the fourth node N4) becomes stationary due to the operation of the first brake B1. Therefore, the Ravingneaux planetary gearset LPG forms a speed line L6 shown in FIG. 3. Accordingly, an output speed of the second ring gear R2 (i.e., the sixth node N6) rotates at a speed D6, and the sixth forward speed is realized.

Finally at a reverse speed, the third clutch C3 and the second brake B2 operate.

In this case, the second sun gear S2 (i.e., the fourth node N5) rotates at the reduced due to the operation of the third clutch C3, while the third planet carrier PC3 (i.e., the fifth node N5) becomes stationary due to the operation of the second brake B2. Therefore, the Ravingneaux planetary gearset LPG forms a speed line LR shown in FIG. 3. Accordingly, an output speed of the second ring gear R2 (i.e., the sixth node N6) rotates at a speed R, and the reverse speed is realized.

Hereinafter, a powertrain according to a second embodiment of the present invention is described in detail with reference to FIG. 4.

Figure 4:
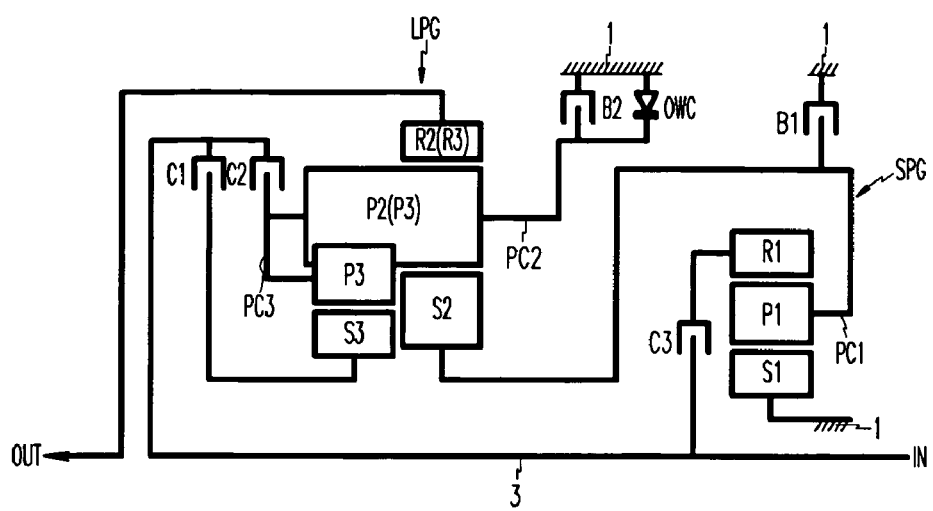
FIG. 4 is a schematic diagram of a powertrain according to a second embodiment of the present invention.

As shown in FIG. 4, a powertrain according to a second embodiment of the present invention includes a same simple planetary gearset SPG and a same Ravingneaux planetary gearset LPG as a powertrain according to the first embodiment of the present invention.

Therefore, according to the powertrain of the present embodiment, the simple planetary gearset SPG forms three operational elements of a first sun gear S1, a first ring gear R1, and a first planet carrier PC1, and the Ravingneaux planetary gearset LPG forms four operational elements of a second sun gear S1, a third sun gear S3, a second ring gear R2, and a third planet carrier PC3, the same as in a powertrain according to the first embodiment of the preset invention.

Fixed or variable interconnections among operational elements of the simple planetary gearset SPG and the Ravingneaux planetary gearset LPG according to a second embodiment of the present invention are the same as in the first embodiment of the present invention.

An input shaft 3 is variably connected to the same operational elements of the planetary gearsets SPG and LPG through same clutches (i.e., first, second, and third clutches C1, C2, and C3) as in the first embodiment of the present invention.

A transmission case 1 is variably connected to the same operational elements of the planetary gearsets SPG and LPG through same brakes (i.e., first and second brakes B1 and B2) as in the first embodiment of the present invention. The transmission case 1 is fixedly connected to the same operational element (i.e., the first sun gear S1) of the planetary gearset SPG as in the first embodiment of the present invention.

Regarding the arrangement of the planetary gearsets, the simple planetary gearset SPG is disposed forward in a transmission, and the Ravingneaux planetary gearset LPG is disposed rearward in the transmission, the same as in the first embodiment.

Differently from the first embodiment, regarding the positioning of the second brake B2 and the one-way clutch OWC, they are positioned between the Ravingneaux planetary gearset and the single pinion planetary gearset, instead of the rear side of the Ravingneaux planetary gearset as in the first embodiment.

In this case, the second brake B2 and the one-way clutch OWC are connected to a second planet carrier PC2 that carries the second planetary gear P2 and positioned in front the Ravingneaux planetary gear set LPG (i.e., in a position opposite to the third planet carrier PC3). The second and third planet carrier may be unified since both of them carry the same planetary carrier P2 and show no speed difference.

In addition, an output torque of the powertrain is output rearward as shown in FIG. 4. Therefore, a powertrain according to the second embodiment of the present invention may be applicable to a rear wheel drive vehicle, while a powertrain according to the first embodiment is applicable to a front wheel drive vehicle.

Input routes for the Ravingneaux planetary gearset LPG to receive input torque directly or indirectly from the input shaft 3 are formed the same as in the first embodiment.

The same operational chart shown in FIG. 2 may be used to operate a powertrain according to the second embodiment of the present invention. Furthermore, a speed diagram of a powertrain according to the second embodiment of the present invention is obtained the same as in the first embodiment.

Hereinafter, a powertrain according to a third embodiment of the present invention is described in detail with reference to FIG. 5.

Figure 5:
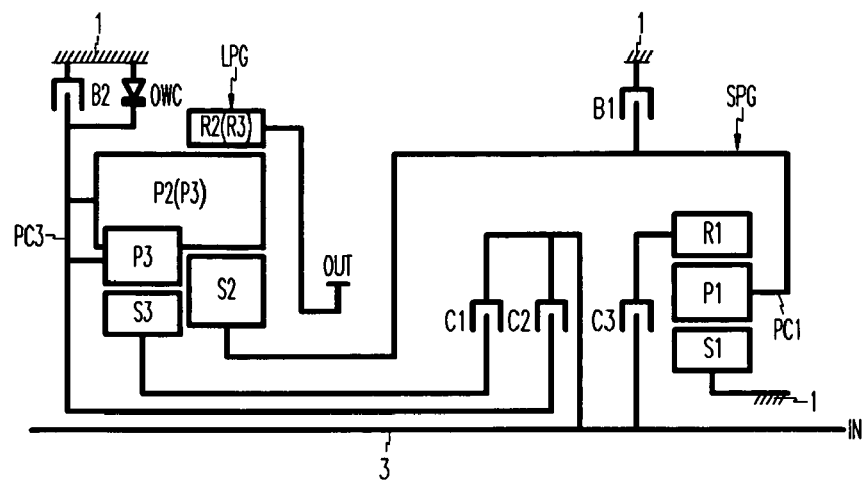
FIG. 5 is a schematic diagram of a powertrain according to a third embodiment of the present invention.

As shown in FIG. 5, a powertrain according to a third embodiment of the present invention includes a same simple planetary gearset SPG and a same Ravingneaux planetary gearset LPG as a powertrain according to the first embodiment of the present invention.

Therefore, according to the powertrain of the present embodiment, the simple planetary gearset SPG forms three operational elements of a first sun gear S1, a first ring gear R1, and a first planet carrier PC1, and the Ravingneaux planetary gearset LPG forms four operational elements of a second sun gear S1, a third sun gear S3, a second ring gear R2, and a third planet carrier PC3, the same as in a powertrain according to the first embodiment of the preset invention.

Fixed or variable interconnections among operational elements of the simple planetary gearset SPG and the Ravingneaux planetary gearset LPG according to a third embodiment of the present invention are the same as in the first embodiment of the present invention.

An input shaft 3 is variably connected to the same operational elements of the planetary gearsets SPG and LPG through same clutches (i.e., first, second, and third clutches C1, C2, and C3) as in the first embodiment of the present invention.

A transmission case 1 is variably connected to the same operational elements of the planetary gearsets SPG and LPG through same brakes (i.e., first and second brakes B1 and B2) as in the first embodiment of the present invention. The transmission case 1 is fixedly connected to the same operational element (i.e., the first sun gear S1) of the planetary gearset SPG as in the first embodiment of the present invention.

Regarding the arrangement of the planetary gearsets, the simple planetary gearset SPG is disposed forward in a transmission, and the Ravingneaux planetary gearset LPG is disposed rearward in the transmission, the same as in the first embodiment.

Differently from the first embodiment, regarding the positioning of the first and second clutches C1 and C2, they are positioned between the Ravingneaux planetary gearset and the single pinion planetary gearset, instead of the rear side of the Ravingneaux planetary gearset as in the first embodiment.

In this case, a powertrain according to the third embodiment of the present invention may become more compact in comparison with a powertrain according to the first embodiment.

Input routes for the Ravingneaux planetary gearset LPG to receive input torque directly or indirectly from the input shaft 3 are formed the same as in the first embodiment.

The same operational chart shown in FIG. 2 may be used to operate a powertrain according to the third embodiment of the present invention. Furthermore, a speed diagram of a powertrain according to the third embodiment of the present invention is obtained the same as in the first embodiment.

Hereinafter, a powertrain according to a fourth embodiment of the present invention is described in detail with reference to FIG. 6.

Figure 6:
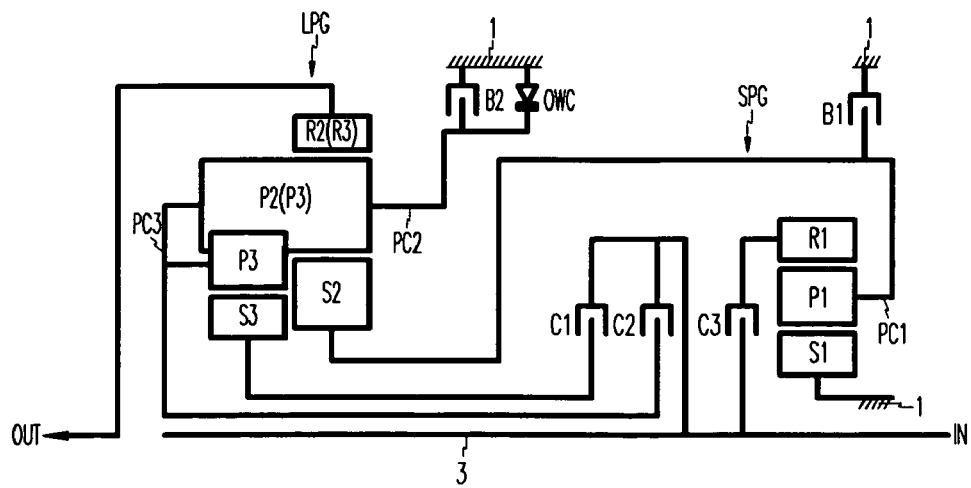
FIG. 6 is a schematic diagram of a powertrain according to a fourth embodiment of the present invention.

As shown in FIG. 6, a powertrain according to a fourth embodiment of the present invention includes a same simple planetary gearset SPG and a same Ravingneaux planetary gearset LPG as a powertrain according to the first embodiment of the present invention.

Therefore, according to the powertrain of the present embodiment, the simple planetary gearset SPG forms three operational elements of a first sun gear S1, a first ring gear R1, and a first planet carrier PC1, and the Ravingneaux planetary gearset LPG forms four operational elements of a second sun gear S1, a third sun gear S3, a second ring gear R2, and a third planet carrier PC3, the same as in a powertrain according to the first embodiment of the preset invention.

Fixed or variable interconnections among operational elements of the simple planetary gearset SPG and the Ravingneaux planetary gearset LPG according to a fourth embodiment of the present invention are the same as in the first embodiment of the present invention.

An input shaft 3 is variably connected to the same operational elements of the planetary gearsets SPG and LPG through same clutches (i.e., first, second, and third clutches C1, C2, and C3) as in the first embodiment of the present invention.

A transmission case 1 is variably connected to the same operational elements of the planetary gearsets SPG and LPG through same brakes (i.e., first and second brakes B1 and B2) as in the first embodiment of the present invention. The transmission case 1 is fixedly connected to the same operational element (i.e., the first sun gear S1) of the planetary gearset SPG as in the first embodiment of the present invention.

Regarding the arrangement of the planetary gearsets, the simple planetary gearset SPG is disposed forward in a transmission, and the Ravingneaux planetary gearset LPG is disposed rearward in the transmission, the same as in the first embodiment.

Differently from the first embodiment, regarding the positioning of the second brake B2 and the one-way clutch OWC, they are positioned between the Ravingneaux planetary gearset and the single pinion planetary gearset, instead of the rear side of the Ravingneaux planetary gearset as in the first embodiment.

In this case, the second brake B2 and the one-way clutch OWC are connected to a second planet carrier PC2 that carries the second planetary gear P2 and positioned in front the Ravingneaux planetary gear set LPG (i.e., in a position opposite to the third planet carrier PC3). The second and third planet carrier may be unified since both of them carry the same planetary carrier P2 and show no speed difference.

In addition, an output torque of the powertrain is output rearward as shown in FIG. 6. Therefore, a powertrain according to the fourth embodiment of the present invention may be applicable to a rear wheel drive vehicle, while a powertrain according to the first embodiment is applicable to a front wheel drive vehicle.

In addition, differently from the first embodiment, regarding the positioning of the first and second clutches C1 and C2, they are positioned between the Ravingneaux planetary gearset and the single pinion planetary gearset, instead of the rear side of the Ravingneaux planetary gearset as in the first embodiment.

In this case, a powertrain according to the fourth embodiment of the present invention may become more compact in comparison with a powertrain according to the first embodiment.

Input routes for the Ravingneaux planetary gearset LPG to receive input torque directly or indirectly from the input shaft 3 are formed the same as in the first embodiment.

The same operational chart shown in FIG. 2 may be used to operate a powertrain according to the fourth embodiment of the present invention. Furthermore, a speed diagram of a powertrain according to the fourth embodiment of the present invention is obtained the same as in the first embodiment.

Hereinafter, a powertrain according to a fifth embodiment of the present invention is described in detail with reference to FIG. 7.

Figure 7:
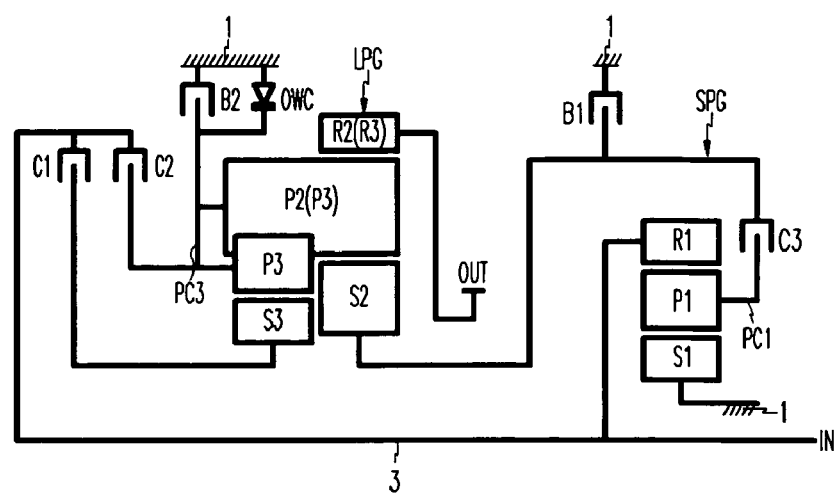
FIG. 7 is a schematic diagram of a powertrain according to a fifth embodiment of the present invention.

As shown in FIG. 7, a powertrain according to a fifth embodiment of the present invention includes a same simple planetary gearset SPG and a same Ravingneaux planetary gearset LPG as a powertrain according to the first embodiment of the present invention.

Therefore, according to the powertrain of the present embodiment, the simple planetary gearset SPG forms three operational elements of a first sun gear S1, a first ring gear R1, and a first planet carrier PC1, and the Ravingneaux planetary gearset LPG forms four operational elements of a second sun gear S1, a third sun gear S3, a second ring gear R2, and a third planet carrier PC3, the same as in a powertrain according to the first embodiment of the preset invention.

An input shaft 3 is variably connected to the third sun gear S3 and the third planetary carrier PC3 through first and second clutches C1 and C2 as in the first embodiment of the present invention.

Differently from the first embodiment, according to the present embodiment, a third clutch C3 variably interconnects the second sun gear S2 and the first plane carrier PC1, instead of the first planetary carrier PC1 and the input shaft 3 of the first embodiment. According to the present embodiment, the first ring gear R1 is fixedly interconnected to the input shaft 3.

A transmission case 1 is variably connected to the second sun gear S2 and the third planetary carrier PC3 through first and second brakes B1 and B2. A one-way clutch OWC is disposed in parallel with the second brake B2. The transmission case 1 is fixedly connected to the same operational element (i.e., the first sun gear S1) of the planetary gearset SPG as in the first embodiment of the present invention.

Regarding the arrangement of the planetary gearsets, the simple planetary gearset SPG is disposed forward in a transmission, and the Ravingneaux planetary gearset LPG is disposed rearward in the transmission, the same as in the first embodiment.

Such a powertrain of the fifth embodiment of the present invention also forms three input routes for the Ravingneaux planetary gearset LPG to receive input torque directly or indirectly from the input shaft 3. First and second input routes are the same as described in connection with the first embodiment. A third input route is formed by a variable connection between the second sun gear S2 and the first planet carrier PC1 through the third clutch C3.

According to the present embodiment, the third clutch C2 interconnects the first planet carrier PC1 with the second sun gear S2 instead of the input shaft 3 of the first embodiment. Therefore, the fact that the second sun gear S2 receives a reduced speed from the simple planetary gearset SPG on an operation of the third clutch C3 is the same as in the first embodiment.

Furthermore, the fact that the second sun gear S2 may be stopped by an operation of the first brake B1 is the same as in the first embodiment.

Therefore, the same operational chart shown in FIG. 2 may be used to operate a powertrain according to the fifth embodiment of the present invention.

Figure 8:
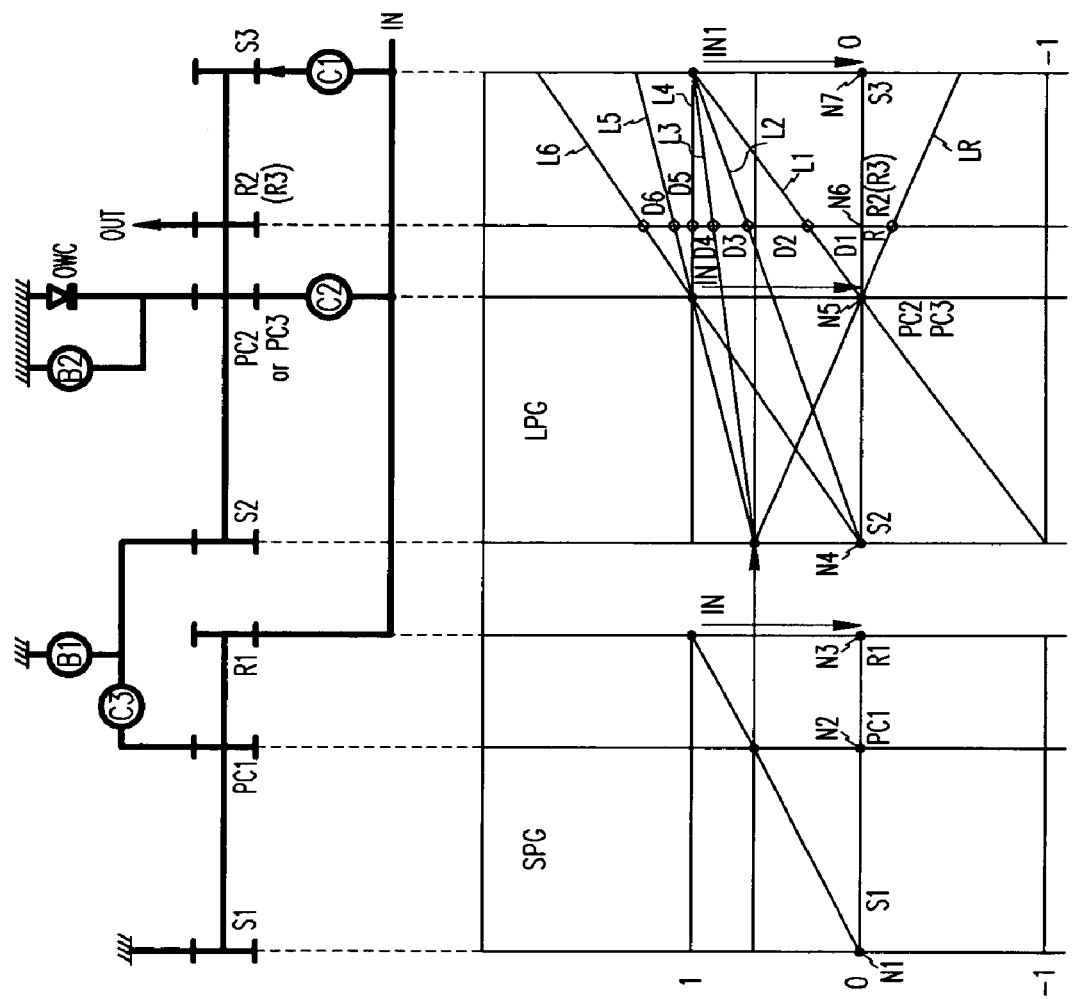
FIG. 8 is a speed diagram for first to sixth forward speeds and reverse speed of a powertrain according to a fifth embodiment of the present invention.

Furthermore, a lever diagram and a speed diagram of a powertrain according to the fifth embodiment of the present invention become as shown in FIG. 8, of which the lever diagram is very similar to one shown in FIG. 3 and the speed diagram is the same as one shown in FIG. 3.

Hereinafter, a powertrain according to a sixth embodiment of the present invention is described in detail with reference to FIG. 9.

Figure 9:
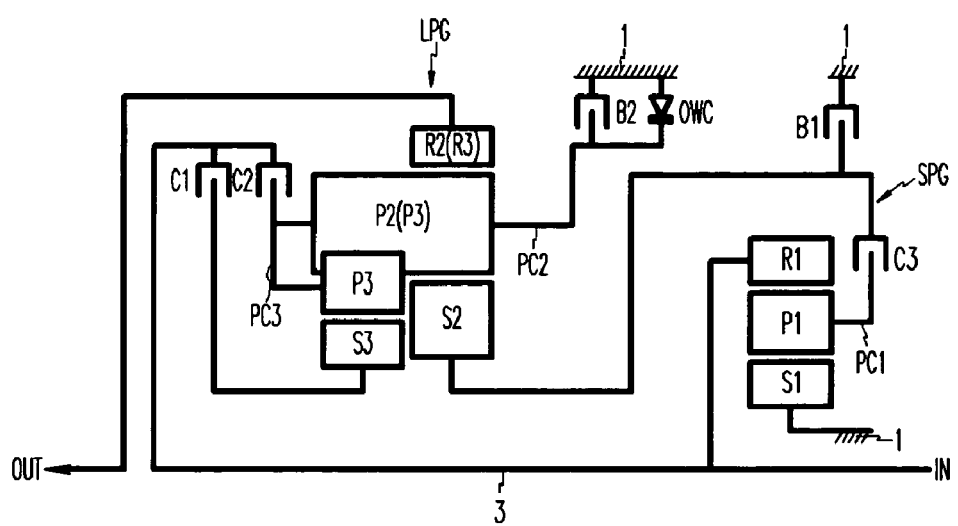
FIG. 9 is a schematic diagram of a powertrain according to a sixth embodiment of the present invention.

As shown in FIG. 9, a powertrain according to a sixth embodiment of the present invention includes a same simple planetary gearset SPG and a same Ravingneaux planetary gearset LPG as a powertrain according to the fifth embodiment of the present invention.

Therefore, according to the powertrain of the present embodiment, the simple planetary gearset SPG forms three operational elements of a first sun gear S1, a first ring gear R1, and a first planet carrier PC1, and the Ravingneaux planetary gearset LPG forms four operational elements of a second sun gear S1, a third sun gear S3, a second ring gear R2, and a third planet carrier PC3, the same as in a powertrain according to the fifth embodiment of the preset invention.

Fixed or variable interconnections among operational elements of the simple planetary gearset SPG and the Ravingneaux planetary gearset LPG according to a sixth embodiment of the present invention are the same as in the fifth embodiment of the present invention.

An input shaft 3 is variably connected to the same operational elements of the Ravingneaux planetary gearset LPG through same clutches (i.e., first and second clutches C1 and C2) as in the fifth embodiment of the present invention. The input shaft 3 is fixedly connected to the first ring gear R1, as same as in the fifth embodiment of the present invention.

A transmission case 1 is variably connected to the same operational elements of the planetary gearsets SPG and LPG through same brakes (i.e., first and second brakes B1 and B2) as in the fifth embodiment of the present invention. The transmission case 1 is fixedly connected to the same operational element (i.e., the first sun gear S1) of the planetary gearset SPG as in the fifth embodiment of the present invention.

Regarding the arrangement of the planetary gearsets, the simple planetary gearset SPG is disposed forward in a transmission, and the Ravingneaux planetary gearset LPG is disposed rearward in the transmission, the same as in the fifth embodiment.

Differently from the fifth embodiment, regarding the positioning of the second brake B2 and the one-way clutch OWC, they are positioned between the Ravingneaux planetary gearset and the single pinion planetary gearset, instead of the rear side of the Ravingneaux planetary gearset as in the fifth embodiment.

In this case, the second brake B2 and the one-way clutch OWC are connected to a second planet carrier PC2 that carries the second planetary gear P2 and positioned in front the Ravingneaux planetary gear set LPG (i.e., in a position opposite to the third planet carrier PC3). The second and third planet carrier may be unified since both of them carry the same planetary carrier P2 and show no speed difference.

In addition, an output torque of the powertrain is output rearward as shown in FIG. 9. Therefore, a powertrain according to the sixth embodiment of the present invention may be applicable to a rear wheel drive vehicle, while a powertrain according to the fifth embodiment is applicable to a front wheel drive vehicle.

Input routes for the Ravingneaux planetary gearset LPG to receive input torque directly or indirectly from the input shaft 3 are formed the same as in the fifth embodiment.

The same operational chart shown in FIG. 2 may be used to operate a powertrain according to the sixth embodiment of the present invention. Furthermore, a speed diagram of a powertrain according to the sixth embodiment of the present invention is obtained the same as in the fifth embodiment.

Hereinafter, a powertrain according to a seventh embodiment of the present invention is described in detail with reference to FIG. 10.

Figure 10:
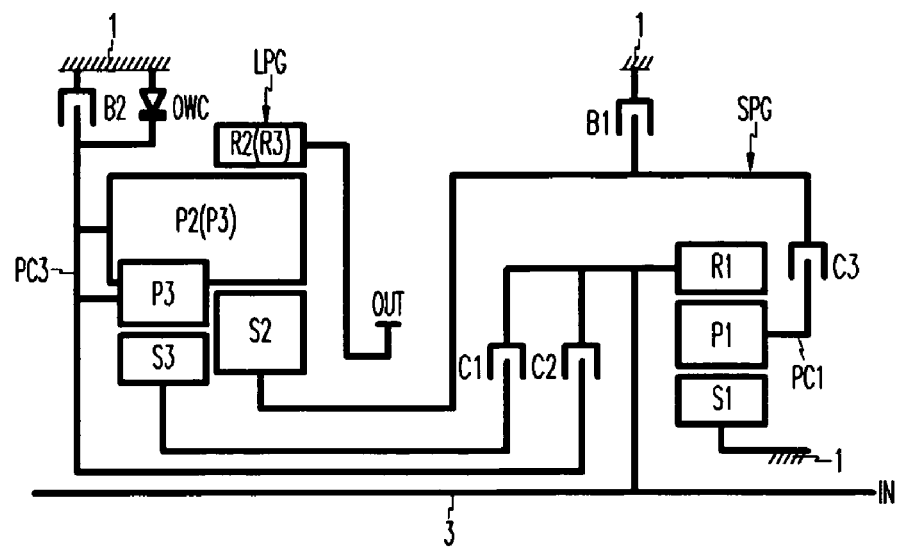
FIG. 10 is a schematic diagram of a powertrain according to a seventh embodiment of the present invention.

As shown in FIG. 10, a powertrain according to a seventh embodiment of the present invention includes a same simple planetary gearset SPG and a same Ravingneaux planetary gearset LPG as a powertrain according to the fifth embodiment of the present invention.

Therefore, according to the powertrain of the present embodiment, the simple planetary gearset SPG forms three operational elements of a first sun gear S1, a first ring gear R1, and a first planet carrier PC1, and the Ravingneaux planetary gearset LPG forms four operational elements of a second sun gear S1, a third sun gear S3, a second ring gear R2, and a third planet carrier PC3, the same as in a powertrain according to the fifth embodiment of the preset invention.

Fixed or variable interconnections among operational elements of the simple planetary gearset SPG and the Ravingneaux planetary gearset LPG according to a seventh embodiment of the present invention are the same as in the fifth embodiment of the present invention.

An input shaft 3 is variably connected to the same operational elements of the Ravingneaux planetary gearset LPG through same clutches (i.e., first and second clutches C1 and C2) as in the fifth embodiment of the present invention. The input shaft 3 is fixedly connected to the first ring gear R1, as same as in the fifth embodiment of the present invention.

A transmission case 1 is variably connected to the same operational elements of the planetary gearsets SPG and LPG through same brakes (i.e., first and second brakes B1 and B2) as in the fifth embodiment of the present invention. The transmission case 1 is fixedly connected to the same operational element (i.e., the first sun gear S1) of the planetary gearset SPG as in the fifth embodiment of the present invention.

Regarding the arrangement of the planetary gearsets, the simple planetary gearset SPG is disposed forward in a transmission, and the Ravingneaux planetary gearset LPG is disposed rearward in the transmission, the same as in the fifth embodiment.

Differently from the fifth embodiment, regarding the positioning of the first and second clutches C1 and C2, they are positioned between the Ravingneaux planetary gearset and the single pinion planetary gearset, instead of the rear side of the Ravingneaux planetary gearset as in the fifth embodiment.

In this case, a powertrain according to the sixth embodiment of the present invention may become more compact in comparison with a powertrain according to the fifth embodiment.

Input routes for the Ravingneaux planetary gearset LPG to receive input torque directly or indirectly from the input shaft 3 are formed the same as in the fifth embodiment.

The same operational chart shown in FIG. 2 may be used to operate a powertrain according to the seventh embodiment of the present invention. Furthermore, a speed diagram of a powertrain according to the seventh embodiment of the present invention is obtained the same as in the fifth embodiment.

Hereinafter, a powertrain according to an eighth embodiment of the present invention is described in detail with reference to FIG. 11.

Figure 11:
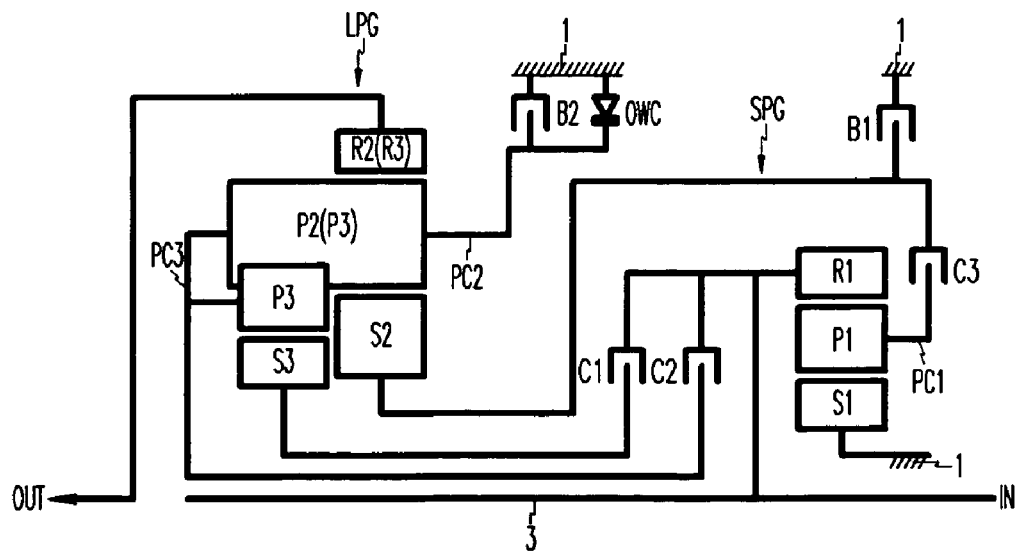
FIG. 11 is a schematic diagram of a powertrain according to an eighth embodiment of the present invention.

As shown in FIG. 11, a powertrain according to an eighth embodiment of the present invention includes a same simple planetary gearset SPG and a same Ravingneaux planetary gearset LPG as a powertrain according to the fifth embodiment of the present invention.

Therefore, according to the powertrain of the present embodiment, the simple planetary gearset SPG forms three operational elements of a first sun gear S1, a first ring gear R1, and a first planet carrier PC1, and the Ravingneaux planetary gearset LPG forms four operational elements of a second sun gear S1, a third sun gear S3, a second ring gear R2, and a third planet carrier PC3, the same as in a powertrain according to the fifth embodiment of the preset invention.

Fixed or variable interconnections among operational elements of the simple planetary gearset SPG and the Ravingneaux planetary gearset LPG according to an eighth embodiment of the present invention are the same as in the fifth embodiment of the present invention.

An input shaft 3 is variably connected to the same operational elements of the Ravingneaux planetary gearset LPG through same clutches (i.e., first and second clutches C1 and C2) as in the fifth embodiment of the present invention. The input shaft 3 is fixedly connected to the first ring gear R1, as same as in the fifth embodiment of the present invention.

A transmission case 1 is variably connected to the same operational elements of the planetary gearsets SPG and LPG through same brakes (i.e., first and second brakes B1 and B2) as in the fifth embodiment of the present invention. The transmission case 1 is fixedly connected to the same operational element (i.e., the first sun gear S1) of the planetary gearset SPG as in the fifth embodiment of the present invention.

Regarding the arrangement of the planetary gearsets, the simple planetary gearset SPG is disposed forward in a transmission, and the Ravingneaux planetary gearset LPG is disposed rearward in the transmission, the same as in the fifth embodiment.

Differently from the fifth embodiment, regarding the positioning of the second brake B2 and the one-way clutch OWC, they are positioned between the Ravingneaux planetary gearset and the single pinion planetary gearset, instead of the rear side of the Ravingneaux planetary gearset as in the fifth embodiment.

In this case, the second brake B2 and the one-way clutch OWC are connected to a second planet carrier PC2 that carries the second planetary gear P2 and positioned in front the Ravingneaux planetary gear set LPG (i.e., in a position opposite to the third planet carrier PC3). The second and third planet carrier may be unified since both of them carry the same planetary carrier P2 and show no speed difference.

In addition, an output torque of the powertrain is output rearward as shown in FIG. 11. Therefore, a powertrain according to the eighth embodiment of the present invention may be applicable to a rear wheel drive vehicle, while a powertrain according to the fifth embodiment is applicable to a front wheel drive vehicle.

In addition, differently from the fifth embodiment, regarding the positioning of the first and second clutches C1 and C2, they are positioned between the Ravingneaux planetary gearset and the single pinion planetary gearset, instead of the rear side of the Ravingneaux planetary gearset as in the fifth embodiment.

In this case, a powertrain according to the eighth embodiment of the present invention may become more compact in comparison with a powertrain according to the fifth embodiment.

Input routes for the Ravingneaux planetary gearset LPG to receive input torque directly or indirectly from the input shaft 3 are formed the same as in the fifth embodiment.

The same operational chart shown in FIG. 2 may be used to operate a powertrain according to the eighth embodiment of the present invention. Furthermore, a speed diagram of a powertrain according to the eighth embodiment of the present invention is obtained the same as in the fifth embodiment.

Hereinafter, a powertrain according to a ninth embodiment of the present invention is described in detail with reference to FIG. 12.

Figure 12:
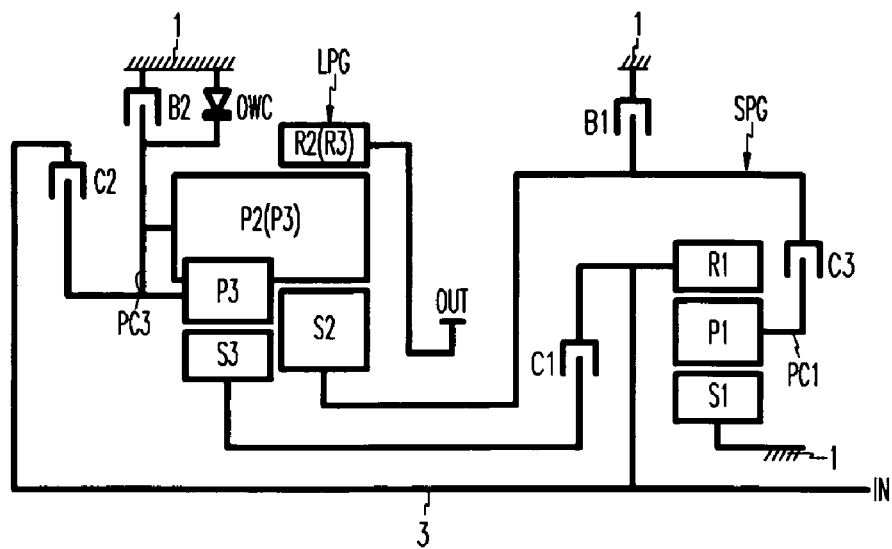
FIG. 12 is a schematic diagram of a powertrain according to a ninth embodiment of the present invention.

As shown in FIG. 12, a powertrain according to a ninth embodiment of the present invention includes a same simple planetary gearset SPG and a same Ravingneaux planetary gearset LPG as a powertrain according to the fifth embodiment of the present invention.

Therefore, according to the powertrain of the present embodiment, the simple planetary gearset SPG forms three operational elements of a first sun gear S1, a first ring gear R1, and a first planet carrier PC1, and the Ravingneaux planetary gearset LPG forms four operational elements of a second sun gear S1, a third sun gear S3, a second ring gear R2, and a third planet carrier PC3, the same as in a powertrain according to the fifth embodiment of the preset invention.

Fixed or variable interconnections among operational elements of the simple planetary gearset SPG and the Ravingneaux planetary gearset LPG according to a ninth embodiment of the present invention are the same as in the fifth embodiment of the present invention.

An input shaft 3 is variably connected to the same operational elements of the Ravingneaux planetary gearset LPG through same clutches (i.e., first and second clutches C1 and C2) as in the fifth embodiment of the present invention. The input shaft 3 is fixedly connected to the first ring gear R1, as same as in the fifth embodiment of the present invention.

A transmission case 1 is variably connected to the same operational elements of the planetary gearsets SPG and LPG through same brakes (i.e., first and second brakes B1 and B2) as in the fifth embodiment of the present invention. The transmission case 1 is fixedly connected to the same operational element (i.e., the first sun gear S1) of the planetary gearset SPG as in the fifth embodiment of the present invention.

Regarding the arrangement of the planetary gearsets, the simple planetary gearset SPG is disposed forward in a transmission, and the Ravingneaux planetary gearset LPG is disposed rearward in the transmission, the same as in the fifth embodiment.

Differently from the fifth embodiment, the first clutch C1 is positioned between the Ravingneaux planetary gearset and the single pinion planetary gearset, instead of the rear side of the Ravingneaux planetary gearset as in the fifth embodiment.

In this case, a powertrain according to the ninth embodiment of the present invention may become more compact in comparison with a powertrain according to the fifth embodiment.

Input routes for the Ravingneaux planetary gearset LPG to receive input torque directly or indirectly from the input shaft 3 are formed the same as in the fifth embodiment.

The same operational chart shown in FIG. 2 may be used to operate a powertrain according to the ninth embodiment of the present invention. Furthermore, a speed diagram of a powertrain according to the ninth embodiment of the present invention is obtained the same as in the fifth embodiment.

Hereinafter, a powertrain according to a tenth embodiment of the present invention is described in detail with reference to FIG. 13.

Figure 13:
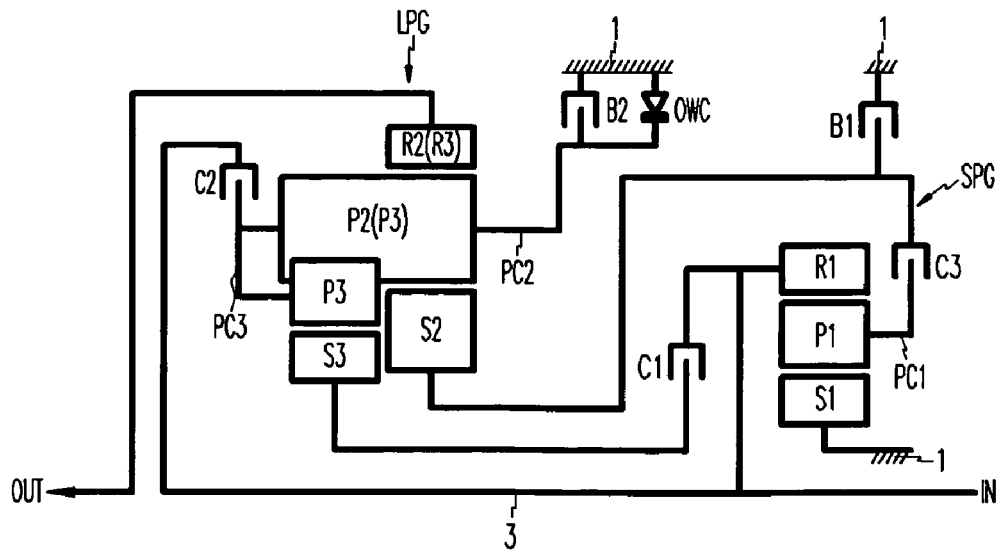
FIG. 13 is a schematic diagram of a powertrain according to a tenth embodiment of the present invention.

As shown in FIG. 13, a powertrain according to a tenth embodiment of the present invention includes a same simple planetary gearset SPG and a same Ravingneaux planetary gearset LPG as a powertrain according to the fifth embodiment of the present invention.

Therefore, according to the powertrain of the present embodiment, the simple planetary gearset SPG forms three operational elements of a first sun gear S1, a first ring gear R1, and a first planet carrier PC1, and the Ravingneaux planetary gearset LPG forms four operational elements of a second sun gear S1, a third sun gear S3, a second ring gear R2, and a third planet carrier PC3, the same as in a powertrain according to the fifth embodiment of the preset invention.

Fixed or variable interconnections among operational elements of the simple planetary gearset SPG and the Ravingneaux planetary gearset LPG according to a tenth embodiment of the present invention are the same as in the fifth embodiment of the present invention.

An input shaft 3 is variably connected to the same operational elements of the Ravingneaux planetary gearset LPG through same clutches (i.e., first and second clutches C1 and C2) as in the fifth embodiment of the present invention. The input shaft 3 is fixedly connected to the first ring gear R1, as same as in the fifth embodiment of the present invention.

A transmission case 1 is variably connected to the same operational elements of the planetary gearsets SPG and LPG through same brakes (i.e., first and second brakes B1 and B2) as in the fifth embodiment of the present invention. The transmission case 1 is fixedly connected to the same operational element (i.e., the first sun gear S1) of the planetary gearset SPG as in the fifth embodiment of the present invention.

Regarding the arrangement of the planetary gearsets, the simple planetary gearset SPG is disposed forward in a transmission, and the Ravingneaux planetary gearset LPG is disposed rearward in the transmission, the same as in the fifth embodiment.

Differently from the fifth embodiment, regarding the positioning of the second brake B2 and the one-way clutch OWC, they are positioned between the Ravingneaux planetary gearset and the single pinion planetary gearset, instead of the rear side of the Ravingneaux planetary gearset as in the fifth embodiment.

In this case, the second brake B2 and the one-way clutch OWC are connected to a second planet carrier PC2 that carries the second planetary gear P2 and positioned in front the Ravingneaux planetary gear set LPG (i.e., in a position opposite to the third planet carrier PC3). The second and third planet carrier may be unified since both of them carry the same planetary carrier P2 and show no speed difference.

In addition, an output torque of the powertrain is output rearward as shown in FIG. 13. Therefore, a powertrain according to the tenth embodiment of the present invention may be applicable to a rear wheel drive vehicle, while a powertrain according to the fifth embodiment is applicable to a front wheel drive vehicle.

In addition, differently from the fifth embodiment, regarding the positioning of the first and second clutches C1 and C2, they are positioned between the Ravingneaux planetary gearset and the single pinion planetary gearset, instead of the rear side of the Ravingneaux planetary gearset as in the fifth embodiment.

In this case, a powertrain according to the tenth embodiment of the present invention may become more compact in comparison with a powertrain according to the fifth embodiment.

Input routes for the Ravingneaux planetary gearset LPG to receive input torque directly or indirectly from the input shaft 3 are formed the same as in the fifth embodiment.

The same operational chart shown in FIG. 2 may be used to operate a powertrain according to the tenth embodiment of the present invention. Furthermore, a speed diagram of a powertrain according to the tenth embodiment of the present invention is obtained the same as in the fifth embodiment.

According to an embodiment of the present invention, the third sun gear is connected to the input shaft such that it may receive the input torque at the same rotation speed of the input shaft. Therefore, durability of the sun gear is enhanced.

Furthermore, the Ravingneaux planetary gearset LPG integrally rotates at the fourth forward speed, while the simple planetary gearset SPG does not contribute to the power transmission. Therefore, at such a fourth speed, torque is transmitted through the powertrain without any loss, and hence, power transmission efficiency is enhanced.

While this invention has been described in connection with what is presently considered to be the most practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A six-speed powertrain of an automatic transmission, comprising:
    a simple planetary gearset having a first sun gear, a first planet carrier, and a first ring gear so as to form a first operation element fixedly connected to a transmission case, a second operational element variably connected to the transmission case, and a third operational element variably or fixedly connected to an input shaft; and
    a compound planetary gearset having second and third sun gears, a shared ring gear, and a shared planet carrier so as to form a fourth operational element variably or fixedly connected to the second operational element, a fifth operational element variably connected to the input shaft, a sixth operational element always acting as an output element, and a seventh operational element variably connected to the input shaft.

2. The powertrain of claim 1, wherein:
    the first operational element is the first sun gear of the simple planetary gearset;
    the second operational element is the first planet carrier of the simple planetary gearset;
    the third operational element is the first ring gear of the simple planetary gearset;
    the fourth operational element is the second sun gear of the compound planetary gearset;
    the fifth operational element is the shared planet carrier of the compound planetary gearset;
    the sixth operational element is the shared ring gear of the compound planetary gearset; and
    the seventh operational element is the third sun gear of the compound planetary gearset,
    wherein:
    the fourth operational element is fixedly connected to the second operational element and variably connected to the transmission case via a first brake;
    the fifth operational element is variably connected to the transmission via at least one of a second brake and a one-way clutch;
    the seventh operational element is variably connected to the input shaft via a first clutch;
    the fifth operational element is variably connected to the input shaft via a second clutch; and
    the third operational element is variably connected to the input shaft via a third clutch.

3. The powertrain of claim 2, wherein the simple planetary gearset is a single pinion planetary gearset.

4. The powertrain of claim 2, wherein the compound planetary gearset is a Ravingneaux planetary gearset.

5. The powertrain of claim 2, wherein a torque of the input shaft is transmitted from the simple planetary gearset to the compound planetary gearset at a reduced speed through an input route from the second operational element to the fourth operational element.

6. The powertrain of claim 5, wherein the transmission of the torque of the input shaft from the simple planetary gearset to the compound planetary gearset is enabled at third, fifth, and reverse speeds by an operation of the third clutch that variably connects the input shaft and the third operational element.

7. The powertrain of claim 2, wherein:
the first clutch and at least one of the second brake and the one-way clutch operate at a first forward speed;
the first clutch and the first brake operate at a second forward speed;
the first clutch and the third clutch operate at a third forward speed;
the first clutch and the second clutch operate at a fourth forward speed;
the second clutch and the third clutch operate at a fifth forward speed;
the second clutch and the first brake operate at a sixth forward speed; and
the third clutch and the second brake operate at a the reverse speed.

8. The powertrain of claim 2, wherein the first and second clutches are positioned opposite of the input shaft with respect to the compound planetary gearset.

9. The powertrain of claim 2, wherein the first and second clutches are positioned between the compound planetary gearset and the simple planetary gearset.

10. The powertrain of claim 2, wherein the third clutch is positioned between the compound planetary gearset and the simple planetary gearset.

11. The powertrain of claim 2, wherein the at least one of the second brake and the one-way clutch is positioned opposite of the input shaft with respect to the compound planetary gearset.

12. The powertrain of claim 2, wherein the at least one of the second brake and the one-way clutch is positioned between the compound planetary gearset and the simple planetary gearset.

13. The powertrain of claim 1, wherein:
the first operational element is the first sun gear of the simple planetary gearset;
the second operational element is the first planet carrier of the simple planetary gearset;
the third operational element is the first ring gear of the simple planetary gearset;
the fourth operational element is the second sun gear of the compound planetary gearset;
the fifth operational element is the shared planet carrier of the compound planetary gearset;
the sixth operational element is the shared ring gear of the compound planetary gearset; and
the seventh operational element is the third sun gear of the compound planetary gearset,
wherein:
the third operational element is fixedly connected to the input shaft;
the fourth operational element is variably connected to the transmission case via a first brake;
the fifth operational element is variably connected to the transmission via at least one of a second brake and a one-way clutch;
the seventh operational element is variably connected to the input shaft via a first clutch;
the fifth operational element is variably connected to the input shaft via a second clutch; and
the fourth operational element is variably connected to the second operational element via a third clutch.

14. The powertrain of claim 13, wherein the simple planetary gearset is a single or a double pinion planetary gearset.

15. The powertrain of claim 13, wherein the compound planetary gearset is a double sun gear planetary gearset.

16. The powertrain of claim 13, wherein a torque of the input shaft is transmitted from the simple planetary gearset to the compound planetary gearset at a reduced speed through an input route from the second operational element to the fourth operational element.

17. The powertrain of claim 16, wherein the transmission of the torque of the input shaft from the simple planetary gearset to the compound planetary gearset is enabled at third, fifth, and reverse speeds by an operation of the third clutch that variably connects the second and fourth operational elements.

18. The powertrain of claim 13, wherein:
the first clutch and at least one of the second brake and the one-way clutch operate at a first forward speed;
the first clutch and the first brake operate at a second forward speed;
the first clutch and the third clutch operate at a third forward speed;
the first clutch and the second clutch operate at a fourth forward speed;
the second clutch and the third clutch operate at a fifth forward speed;
the second clutch and the first brake operate at a sixth forward speed; and
the third clutch and the second brake operate at a the reverse speed.

19. The powertrain of claim 13, wherein the first and second clutches are positioned opposite of the input shaft with respect to the compound planetary gearset.

20. The powertrain of claim 13, wherein the first and second clutches are positioned between the compound planetary gearset and the simple planetary gearset.

21. The powertrain of claim 13, wherein the third clutch is positioned opposite of the input shaft with respect to the simple planetary gearset.

22. The powertrain of claim 13, wherein the at least one of the second brake and the one-way clutch is positioned opposite of the input shaft with respect to the compound planetary gearset.

23. The powertrain of claim 13, wherein:
the first clutch is positioned between the compound planetary gearset and the simple planetary gearset;
the second clutch is positioned opposite of the input shaft with respect to the compound planetary gearset; and
the third clutch is positioned opposite of the input shaft with respect to the simple planetary gearset.

24. A six-speed powertrain of an automatic transmission, comprising a simple planetary gearset and a compound planetary gearset disposed to a rear of the simple planetary gearset, the simple planetary gearset having first, second, and third operational elements of a first sun gear, a first planet carrier, and a first ring gear, the compound planetary gearset having fourth, fifth, sixth and seventh operational elements of a second sun gear, a third sun gear, a shared planet carrier, and a shared ring gear, wherein:
the first sun gear of the simple planetary gearset is fixedly connected to a transmission case so as to always act as a fixed element;
the first ring gear of the simple planetary gearset is fixedly or variably connected to an input shaft;
the shared ring gear of the compound planetary gearset always acts as an output element;
the shared planet carrier of the compound planetary gearset is variably connected to the input shaft;
the third sun gear of the compound planetary gearset is variably connected to the input shaft; and
the second sun gear of the compound planetary gearset is fixedly or variably connected to the first planet carrier of the simple planetary gearset.

25. The powertrain of claim 24, wherein:
the second sun gear is fixedly connected to the first planet carrier;
the second sun gear is variably connected to the transmission case via a first brake;
the shared planet carrier is variably connected to the input shaft via at least one of a second brake and a one-way clutch;
the third sun gear is variably connected to the input shaft via a first clutch;
the shared planet carrier is variably connected to the input shaft via a second clutch; and
the first ring gear is variably connected to the input shaft via a third clutch.

26. The powertrain of claim 25, wherein a torque of the input shaft is transmitted from the simple planetary gearset to the compound planetary gearset at a reduced speed through an input route from the first planet carrier to the second sun gear.

27. The powertrain of claim 26, wherein the transmission of the torque of the input shaft from the simple planetary gearset to the compound planetary gearset is enabled at third, fifth, and reverse speeds by an operation of the third clutch that variably connects the input shaft and the first ring gear.

28. The powertrain of claim 25, wherein:
the first clutch and at least one of the second brake and the one-way clutch operate at a first forward speed;
the first clutch and the first brake operate at a second forward speed;
the first clutch and the third clutch operate at a third forward speed;
the first clutch and the second clutch operate at a fourth forward speed;
the second clutch and the third clutch operate at a fifth forward speed;
the second clutch and the first brake operate at a sixth forward speed; and
the third clutch and the second brake operate at a the reverse speed.

29. The powertrain of claim 25, wherein the first and second clutches are positioned opposite of the input shaft with respect to the compound planetary gearset.

30. The powertrain of claim 25, wherein the first and second clutches are positioned between the compound planetary gearset and the simple planetary gearset.

31. The powertrain of claim 25, wherein the third clutch is positioned between the compound planetary gearset and the simple planetary gearset.

32. The powertrain of claim 25, wherein the at least one of the second brake and the one-way clutch is positioned opposite of the input shaft with respect to the compound planetary gearset.

33. The powertrain of claim 25, wherein the at least one of the second brake and the one-way clutch is positioned between the compound planetary gearset and the simple planetary gearset.

34. The powertrain of claim 24, wherein:
the first ring gear is fixedly connected to the input shaft;
the second sun gear is variably connected to the transmission case via a first brake;
the shared planet carrier is variably connected to the input shaft via at least one of a second brake and a one-way clutch;
the third sun gear is variably connected to the input shaft via a first clutch;
the shared planet carrier is variably connected to the input shaft via a second clutch; and
the second sun gear is variably connected to the first planet carrier via a third clutch.

35. The powertrain of claim 34, wherein a torque of the input shaft is transmitted from the simple planetary gearset to the compound planetary gearset at a reduced speed through an input route from the first planet carrier to the second sun gear.

36. The powertrain of claim 35, wherein the transmission of the torque of the input shaft from the simple planetary gearset to the compound planetary gearset is enabled at third, fifth, and reverse speeds by an operation of the third clutch that variably connects the second sun gear and the first planet carrier.

37. The powertrain of claim 34, wherein:
the first clutch and at least one of the second brake and the one-way clutch operate at a first forward speed;
the first clutch and the first brake operate at a second forward speed;
the first clutch and the third clutch operate at a third forward speed;
the first clutch and the second clutch operate at a fourth forward speed;
the second clutch and the third clutch operate at a fifth forward speed;
the second clutch and the first brake operate at a sixth forward speed; and
the third clutch and the second brake operate at a the reverse speed.

38. The powertrain of claim 34, wherein the first and second clutches are positioned opposite of the input shaft with respect to the compound planetary gearset.

39. The powertrain of claim 34, wherein the first and second clutches are positioned between the compound planetary gearset and the simple planetary gearset.

40. The powertrain of claim 34, wherein the third clutch is positioned close to the input shaft with respect to the simple planetary gearset.

41. The powertrain of claim 34, wherein the at least one of the second brake and the one-way clutch is positioned opposite of the input shaft with respect to the compound planetary gearset.

42. The powertrain of claim 34, wherein:
the first clutch is positioned between the compound planetary gearset and the simple planetary gearset;
the second clutch is positioned opposite of the input shaft with respect to the compound planetary gearset; and
the third clutch is positioned close to the input shaft with respect to the simple planetary gearset.

* * * * *